(12) United States Patent
Allie

(10) Patent No.: US 6,505,386 B1
(45) Date of Patent: Jan. 14, 2003

(54) GROMMET—WIRE HARNESS RETAINER

(75) Inventor: James A Allie, Berkley, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/915,128

(22) Filed: Jul. 25, 2001

(51) Int. Cl.[7] .......................... F16B 19/00; A44B 17/00
(52) U.S. Cl. ........................... 24/458; 24/289; 24/297; 24/453
(58) Field of Search .......................... 24/289, 292, 297, 24/324, 453, 457, 458, 531, 662; 411/182, 338, 339, 508–510, 437, 913; 52/718.01

(56) References Cited

U.S. PATENT DOCUMENTS

| | | | |
|---|---|---|---|
| 3,272,059 A | * | 9/1966 | Lyday et al. ................ 411/510 |
| 4,176,428 A | * | 12/1979 | Kimura ........................ 24/326 |
| 4,290,536 A | | 9/1981 | Morel |
| 4,363,160 A | | 12/1982 | Wibrow |
| 4,579,493 A | * | 4/1986 | Schaty ....................... 411/510 |
| 4,646,932 A | | 3/1987 | Masier |
| 4,850,778 A | * | 7/1989 | Clough et al. .............. 411/433 |
| 4,881,861 A | | 11/1989 | Hewison |
| 4,890,966 A | * | 1/1990 | Umezawa ................... 411/340 |
| 5,143,500 A | * | 9/1992 | Schuring et al. ............ 411/339 |
| 5,197,840 A | * | 3/1993 | Peek .......................... 411/433 |
| 5,267,667 A | | 12/1993 | Cozzani |
| 5,291,639 A | * | 3/1994 | Baum et al. .................. 24/297 |
| 5,339,491 A | * | 8/1994 | Sims ............................ 16/2.2 |
| 5,540,528 A | | 7/1996 | Schnidt et al. |
| D377,448 S | * | 1/1997 | Nakamura .................... D8/374 |
| 5,754,412 A | * | 5/1998 | Clavin ...................... 24/453 X |
| 5,779,411 A | | 7/1998 | Vasseur et al. |
| 5,797,714 A | | 8/1998 | Oddenino |
| 5,885,042 A | | 3/1999 | Jonatzke |
| 6,345,420 B1 | * | 2/2002 | Nabeshima .................. 24/297 |

* cited by examiner

*Primary Examiner*—Robert J. Sandy
*Assistant Examiner*—Ruth C. Rodriguez
(74) *Attorney, Agent, or Firm*—Edwin W. Bacon, Jr.

(57) ABSTRACT

A grommet having a tubular shank and a head. Retainers project radially outwardly from said shank. The shank has an annular sealing ring between the head and the retainers. The shank is adapted to be inserted into a hole in a panel by pressing the shank, open and first, into the hole from the outer side of the panel in an axially inward direction to a position in which the sealing ring makes sealing contact with the hole and the retainers retain the head of the grommet in sealing contact with an outer surface of the panel. The shank has a hollow interior provided with ridges capturing a fastener pressed into the shank through an open end of said shank in an axially outward direction.

8 Claims, 2 Drawing Sheets ated scallops 52 angularly spaced apart equal distances

GROMMET— WIRE HARNESS RETAINER

FIELD OF THE INVENTION

This invention relates to grommets used to mount a fastener on a panel.

BACKGROUND OF THE INVENTION

A grommet is often used in the automotive industry to mount a fastener on the inner side of a vehicle panel, with the fastener supporting a wire harness, for example. Typically, the grommet has had a head and a tubular shank and is attached to the panel by pressing the shank outwardly into a hole in the panel from the inner side. The fastener is inserted into the tubular shank by pressing the fastener outwardly through an opening in the head. Installing the grommet from the inner side of the panel is awkward and time consuming, and sealing the hole in the panel has been a problem.

SUMMARY OF THE INVENTION

The grommet of this invention is adapted to be installed in the hole in the panel by pressing it inwardly from the outer side of the panel. The grommet head seals against the outer surface of the panel. The shank of the grommet seals the hole. The two seals prevent the elements, including rain and snow, from entering through the hole. The fastener, which may be a Christmas tree type fastener, is inserted into the tubular shank of the fastener by pressing it outwardly through the open end of the shank.

One object of this invention is to provide a grommet having the foregoing features and capabilities.

Other objects and areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
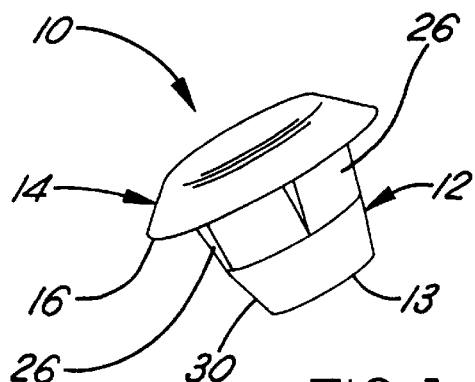
FIG. 1 is a perspective view of a grommet constructed in accordance with the invention.
Figure 2:
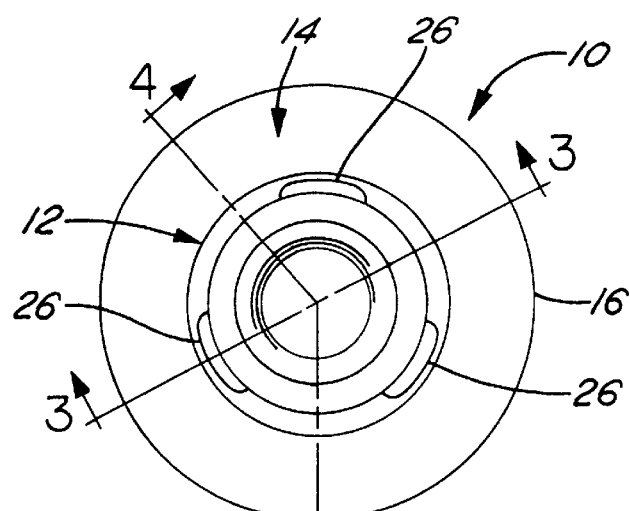
FIG. 2 is an elevational view looking in the open end of the grommet.
Figure 3:
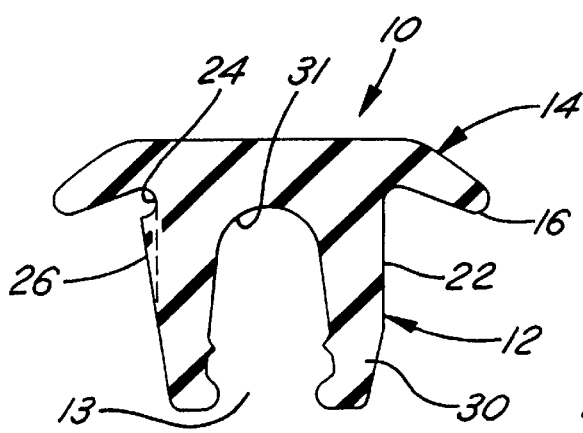
FIG. 3 is a sectional view taken on the line 3—3 in FIG. 2.
Figure 4:
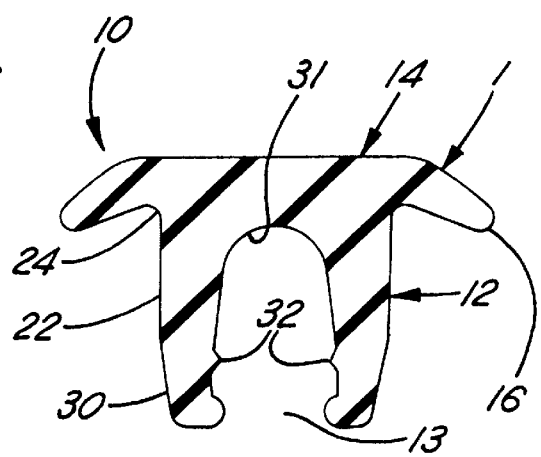
FIG. 4 is a sectional view taken on the line 4—4 in FIG. 2.

The following description of the preferred embodiment is merely exemplary in nature and is in no way intended to limit the invention, its application or uses.

Referring now more particularly to the drawings and especially FIGS. 1–5, there is shown a grommet 10 having a one-piece body including a tubular shank 12 having an open end 13, and a head 14 integrally formed on the opposite closed end of the shank 12. The grommet 10 is made of a suitable flexible, compressible, elastomeric material, preferably rubber having a durometer value of about 60+/−5.

The head 14 extends radially outwardly from the shank 12 and curves toward the open end 13 of the shank 12 to provide a sealing edge 16.

The shank 12 has a cylindrical outer surface portion 22 extending from the head 14 toward the open end 13 of the shank 12 to a point about midway in the length of the shank 12. A narrow part of the outer surface portion 22 adjacent to the head 14 provides a cylindrical or circular sealing ring 24 to be described more fully hereinafter.

Extending laterally outwardly from the outer surface portion 22 are three wedge-like retainers 26 angularly spaced apart equal distances from one another. The sealing ring 24 is between the head 14 and the retainers 26. The retainers 26 are formed integrally with the shank 12 and taper radially inwardly in a direction toward the open end 13 of the shank 12 to a point where they merge into the outer surface portion 22 of the shank 12. The shank 12 has a radially inwardly tapering portion 30 extending from the cylindrical outer surface portion 22 to the open end 13 of the shank 12.

The inner surface 31 defining the hollow interior of the shank 12 has ridges 32 adapted to be engaged by the barbs 34 of a Christmas tree type fastener 36 which is insertable into the hollow interior through the open end 13 of the shank 12 and retained therein by such ridges 32. A wiring harness 38 is secured to the fastener 36.

Figure 5:
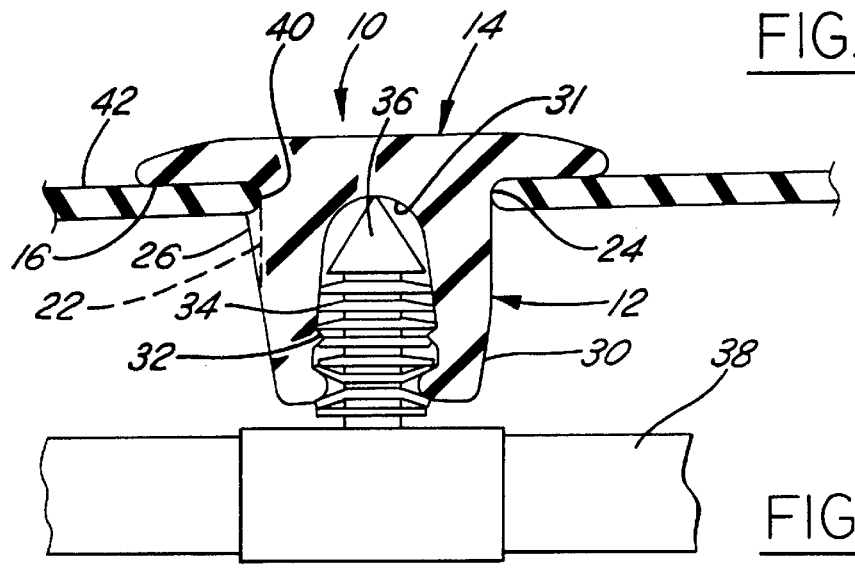
FIG. 5 is a view partly in section and partly in elevation, showing the grommet installed in a hole in a panel, and a fastener inserted in the hollow interior of the shank of the grommet.

The grommet 10 is adapted to be inserted into a circular hole 40 in a panel 42 from the outer, or weather, side of the panel, by pressing the shank 12, open end 13 first, in an axially inward direction to a final installed position as shown in FIG. 5. The retainers 26 are compressed during this insertion of the shank 12. The outside diameter of the cylindrical outer surface portion 22 of the shank 12, including the sealing ring 24 thereof, is slightly larger than the diameter of the hole, so that when fully inserted in the hole, the sealing ring 24 has an interference fit in 360° sealing contact with the hole and the sealing edge 16 of the head 14 has 360° sealing contact with the outer surface of the panel. The two seals, provided by the sealing ring 24 and the sealing edge 16, effectively exclude and prevent moisture from passing through the hole 40 to the inner side of the panel.

Figure 6:
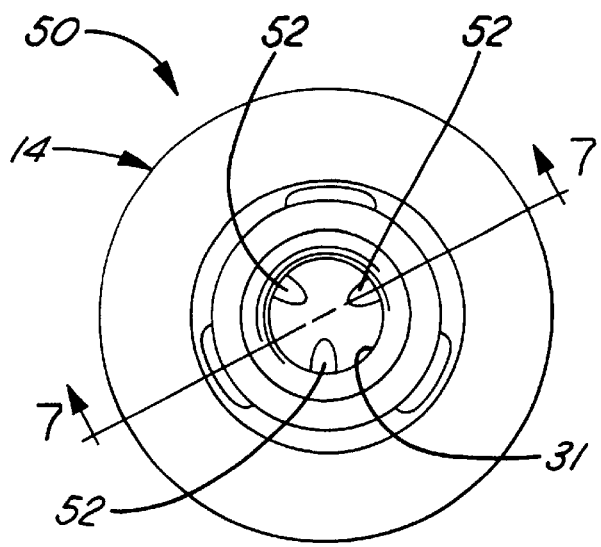
FIG. 6 is an elevational view looking in the open end of a grommet of modified construction.
Figure 7:
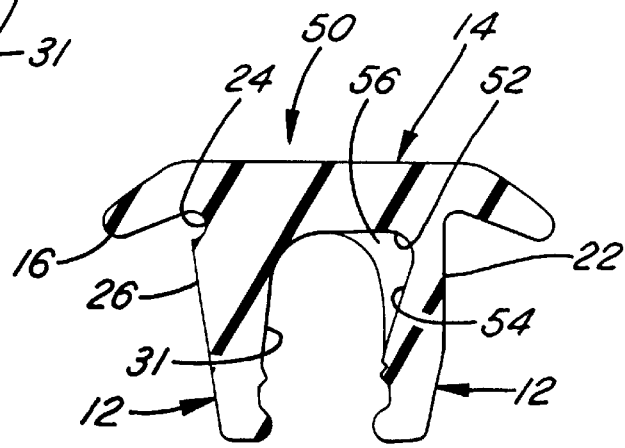
FIG. 7 is a sectional view taken on the line 7—7 in FIG. 6.

FIGS. 6 and 7 show a modified grommet 50 which is like the grommet 10 in FIGS. 1–5 with the addition of the recesses or scallops 52. The parts of the grommet 50 which correspond to similar parts of the grommet 10 have the same reference numbers. There are three narrow, somewhat elongated scallops 52 angularly spaced apart equal distances from one another. Looking at FIG. 6, the scallops 52 are placed between the respective retainers 26 adjacent to the sealing ring 24. The scallops 52 are formed in the inner surface 31 defining the hollow interior of the shank 12, extending from points in the side portion 54 of the inner surface 31 to the transverse or end portion 56 thereof.

Because the diameter of the shank 12 along the outer surface portion 22, and including the sealing ring 24, is greater than the diameter of the hole 40 in the panel, the shank 12 is compressed or squeezed laterally inwardly during insertion of the shank 12 in the hole 40. The scallops 52 provide space into which the compressed material of the shank 12 may flow, thus enabling the shank 12 to be inserted with less pressure and thereby facilitating installation of the shank 12 in the hole 40.

Except for the addition of the scallops, the grommet 50 is exactly like the grommet 10.

Figure 8:
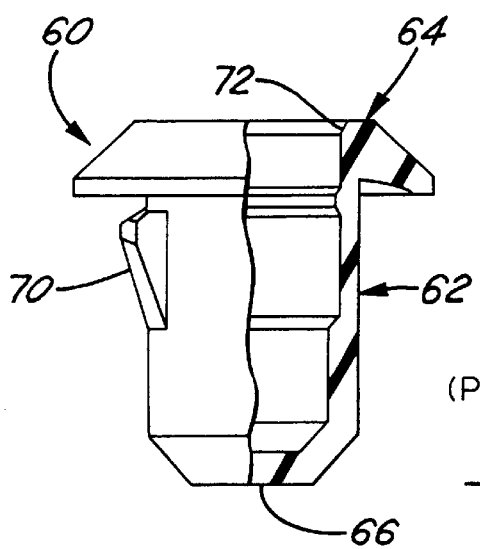
FIG. 8 is an elevational view with parts in section, of a grommet of a prior art construction.

FIG. 8 shows a typical prior art grommet 60. The grommet 60 has a tubular shank 62 and a head 64 at one end of the shank. The outer end of the shank 62 is closed by a transverse wall 66. The grommet 60 has retainers 70 (only one is shown) spaced apart around the shank for retaining the grommet shank in a panel hole. The grommet 60 is intended to be installed in the hole from the inner side of the panel in an outward direction. A fastener is insertable into the hollow interior of the shank 62 through an opening 72 in the head 64 in the same outward direction. The outer surface of the shank does not make sealing contact with the hole. Sealing is provided only by contact of the outer periphery of the head with the inner surface of the panel around the hole so that sealing takes place only after moisture from the outside has passed through the hole.

The description of the invention is merely exemplary in nature and, thus variations that do not depart from the gist of the invention are intended to be within the scope of the invention. Such variations are not to be regarded as a departure from the spirit and scope of the invention.

What is claimed is:

1. A grommet having a body, said body comprising:

a tubular shank having an open end and a closed end, a head at the closed end of the shank extending radially outwardly from said shank, retainers projecting radially outwardly from said shank in spaced relation to said head, said body, including said shank, said head and said retainers, is of integral, one-piece construction and made of a flexible, compressible, elastomeric material, said shank having a laterally outer surface portion providing a cylindrical sealing ring between said head and said retainers, said shank being adapted to be inserted into a hole in a panel by pressing the shank, open end first, into the hole from the outer side of the panel in an axially inward direction to a position in which the sealing ring makes sealing contact with the hole and the retainers retain the head of the grommet in sealing contact with an outer surface of the panel, said tubular shank having a hollow interior provided with means for capturing a fastener pressed into the hollow interior through the open end of said shank in an axially outward direction, and wherein the interior of said shank is defined by an inner surface, said inner surface adjacent to said sealing ring has angularly spaced recesses, said recesses enabling said shank and said sealing ring to be compressed more readily when said shank is pressed into the hole in the panel.

2. A grommet as defined in claim 1, wherein said inner surface has an annular side portion and an end portion, and said recesses extend into said side and end portions of said inner surface.

3. In combination, a grommet, said grommet having a body including a tubular shank having an open end and a closed end, a head at the closed end of the shank extending radially outwardly from said shank, retainers projecting radially outwardly from said shank in spaced relation to said head, said shank having a laterally outer surface portion providing a circular sealing ring between said head and said retainers, said tubular shank having a hollow interior provided with means for capturing a fastener pressed into the hollow interior through the open end of the shank in an axially outward direction, said hollow interior of said shank is defined by an inner surface, said inner surface adjacent to said sealing ring has angularly spaced recesses, said recesses enabling said shank and said sealing ring to be compressed more readily when said shank is pressed into the hole in the panel, said body, including said shank, said head and said retainers, being of one-piece construction and made of a flexible, compressible, elastomeric material, a panel having a hole, said shank being adapted to be inserted into the hole by pressing the shank, open end first, into the hole from the outer side of the panel in an axially inward direction to a position in which the sealing ring makes sealing contact with the hole and the retainers retain the head of the grommet in sealing contact with an outer surface of the panel, and said sealing ring in its uncompressed, natural, free state condition being larger in diameter than said hole to have an interference fit with said hole when said shank is inserted therein.

4. The combination of claim 3, wherein said inner surface has an annular side portion and an end portion, and said recesses extend into said side and end portions of said inner surface.

5. A grommet having a body, said body comprising:

a tubular shank having an open end and a closed end, a head at the closed end of the shank extending radially outwardly from said shank, retainers projecting radially outwardly from said shank in spaced relation to said head, said shank having a laterally outer surface portion providing an annular sealing ring between said head and said retainers, said shank being adapted to be inserted into a hole in a panel by pressing the shank, open end first, into the hole from the outer side of the panel in an axially inward direction to a position in which the sealing ring makes sealing contact with the hole and the retainers retain the head of the grommet in sealing contact with an outer surface of the panel, wherein the interior of said shank is defined by an inner surface, said inner surface adjacent to said sealing ring has angularly spaced recesses, said recesses enabling said shank and said sealing ring to be compressed more readily when said shank is pressed into the hole in the panel.

6. A grommet as defined in claim 5, wherein said body, including said shank, said head and said retainers, is of integral, one-piece construction and made of a flexible, compressible, elastomeric material.

7. A grommet as defined in claim 5, wherein said sealing ring is cylindrical.

8. A grommet as defined in claim 5, wherein said elastomeric material has a durometer value of about 60+/−5.

* * * * *